(12) United States Patent　(10) Patent No.: US 11,731,406 B2
Nakanishi et al.　(45) Date of Patent: Aug. 22, 2023

(54) LAMINATE AND STAND-UP POUCH

(71) Applicant: Mitsubishi Chemical Corporation, Tokyo (JP)

(72) Inventors: Shinji Nakanishi, Tokyo (JP); Kohei Oura, Tokyo (JP); Yoshitaka Matsumura, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 17/315,984

(22) Filed: May 10, 2021

(65) Prior Publication Data

US 2021/0260856 A1　Aug. 26, 2021

Related U.S. Application Data

(63) Continuation of application No. PCT/JP2019/044640, filed on Nov. 14, 2019.

(30) Foreign Application Priority Data

Nov. 15, 2018　(JP) .................. 2018-214871

(51) Int. Cl.
　　*B32B 27/08*　(2006.01)
　　*B32B 1/00*　(2006.01)
　　(Continued)

(52) U.S. Cl.
　　CPC ............. *B32B 27/08* (2013.01); *B32B 1/00* (2013.01); *B32B 7/12* (2013.01); *B32B 27/306* (2013.01);
　　(Continued)

(58) Field of Classification Search
　　CPC ......... B32B 27/08; B32B 7/12; B32B 27/306; B32B 27/32; B32B 27/34; B32B 27/36;
　　(Continued)

(56) References Cited

U.S. PATENT DOCUMENTS

2018/0099493 A1　4/2018　Usui

FOREIGN PATENT DOCUMENTS

JP　　2006-150737 A　　6/2006
JP　　2016-203634 A　　12/2016
(Continued)

OTHER PUBLICATIONS

ISR issued in WIPO Patent Application No. PCT/JP2019/044640, Jan. 28, 2020, English translation.
(Continued)

*Primary Examiner* — Michael C Miggins
(74) *Attorney, Agent, or Firm* — Greenblum & Bernstein, P.L.C.

(57) ABSTRACT

Disclosed is a laminate including a protection layer, a barrier layer, and a heat sealing layer, in which a product of a tensile elastic modulus A in a reference direction, a tensile elastic modulus B in a direction forming an angle of 45° with respect to the reference direction, and a tensile elastic modulus C in a direction forming an angle of 90° with respect to the reference direction is 0.22 (GPa)$^3$ or less, and a value of the tensile elastic modulus B to the tensile elastic modulus A, a value of the tensile elastic modulus C to the tensile elastic modulus A, and a value of the tensile elastic modulus C to the tensile elastic modulus B are each 0.1 to 10.

11 Claims, 1 Drawing Sheet

(51) Int. Cl.
*B32B 7/12* (2006.01)
*B32B 27/30* (2006.01)
*B32B 27/32* (2006.01)
*B32B 27/34* (2006.01)
*B32B 27/36* (2006.01)
*B65D 65/40* (2006.01)
*B65D 75/00* (2006.01)

(52) U.S. Cl.
CPC .............. *B32B 27/32* (2013.01); *B32B 27/34* (2013.01); *B32B 27/36* (2013.01); *B65D 65/40* (2013.01); *B65D 75/008* (2013.01); *B32B 2250/05* (2013.01); *B32B 2250/24* (2013.01); *B32B 2270/00* (2013.01); *B32B 2274/00* (2013.01); *B32B 2307/31* (2013.01); *B32B 2307/54* (2013.01); *B32B 2307/7244* (2013.01); *B32B 2439/40* (2013.01)

(58) Field of Classification Search
CPC ............ B32B 2250/24; B32B 2270/00; B32B 2307/54
See application file for complete search history.

(56) References Cited

FOREIGN PATENT DOCUMENTS

| | | |
|---|---|---|
| JP | 2017-226145 A | 12/2017 |
| JP | 2018-53180 A | 4/2018 |
| WO | 2018/079161 A1 | 5/2018 |

OTHER PUBLICATIONS

Written Opinion issued in WIPO Patent Application No. PCT/JP2019/044640, dated Jan. 28, 2020, English translation.

IPRP issued in WIPO Patent Application No. PCT/JP2019/044640, May 18, 2021, English translation.

Extended European Search Report issued in EPO Patent Application No. 19884274.2, dated Dec. 1, 2021.

Office Action issued in CN Patent Application No. 201980073905.2, dated Sep. 30, 2022, translation.

LAMINATE AND STAND-UP POUCH

CLAIM FOR PRIORITY

This application is a Continuation of PCT/JP2019/044640 filed Nov. 14, 2019, and claims the priority benefit of Japanese application 2018-214871 filed Nov. 15, 2018, the contents of which are expressly incorporated by reference herein in their entireties.

TECHNICAL FIELD

The present invention relates to a laminate and a stand-up pouch including the laminate.

BACKGROUND ART

A retort treatment (for example, a hot water treatment at 120° C. for 30 minutes) has become one of the widely known sterilization techniques along with the longevity of food. Packaging materials for foods, beverages, etc. are required to have a high oxygen barrier property in order to prevent odor transfer to contents or oxidative deterioration during storage after the retort treatment.

Conventionally, bottles and cans have been used as retort packaging materials for foods, beverages, etc., and flexible packaging has been developed from the viewpoint of customer convenience such as ease of disposal. In particular, self-supporting packaging bags (hereinafter, may be referred to as "stand-up pouches") with good product display have become widespread. As a laminate constituting the stand-up pouch, there are a large number of configurations having both stiffness, which renders the pouch self-supporting after filling with contents, and an oxygen barrier property from the viewpoint of preventing the contents from deteriorating.

Examples of the above laminate constituting the stand-up pouch include a laminate having a layer configuration of PET stretched film/Ny stretched film/Al foil/CPP, PET stretched film/Al foil/Ny stretched film/CPP or PET stretched film/Al foil/CPP, which is obtained by laminating at least one selected from a polyethylene terephthalate (hereinafter, may be referred to as "PET") stretched film, a nylon (hereinafter, may be referred to as "Ny") stretched film, and an aluminum foil (hereinafter, may be referred to as "Al foil", and the "Al foil" is used as a barrier layer) on a heat sealing layer containing polypropylene as a main component, such as non-axially stretched polypropylene (hereinafter, may be referred to as "CPP").

However, when a stand-up pouch having an Al foil as a barrier layer is used as a food packaging material, there is a problem that a microwave oven cannot be used, so that there is an increasing demand for a stand-up pouch that does not use an Al foil.

As a stand-up pouch for solving this problem, for example, Patent Literature 1 discloses a stand-up pouch for retort including a protection layer and a polyamide-based resin layer, an ethylene-vinyl alcohol-based copolymer (hereinafter, may be referred to as "EVOH") layer and a heat sealing resin layer on one surface of the protection layer, and including a laminated material in which the polyamide-based resin layer and the ethylene-vinyl alcohol-based copolymer layer are adjacent to each other.

However, the stand-up pouch disclosed in Patent Literature 1 has room for improvement in terms of bag falling resistance (a property that when the stand-up pouch receives a momentary bending impact due to falling, the laminate constituting the stand-up pouch cracks, the laminate cracks in some cases, but the contents do not leak) during transportation.

As a technique for improving the bag falling resistance of the stand-up pouch, for example, Patent Literature 2 discloses a multilayer structure for stand-up pouch including an ethylene-vinyl alcohol-based copolymer (C) layer between a protection layer (A) and a heat sealing resin (D) layer, in which a resin composition (h) constituting the heat sealing resin (D) layer contains a thermoplastic elastomer, and a concentration of the thermoplastic elastomer on the heat sealing resin (D) layer is lower on a surface layer at an opposite side of the protection layer (A) side than on a surface layer at the protection layer (A) side.

CITATION LIST

Patent Literature

Patent Literature 1: JP-A-2016-203634
Patent Literature 2: JP-A-2017-226145

SUMMARY OF INVENTION

Technical Problem

In the stand-up pouch disclosed in Patent Literature 2, an elastomer component is blended in the heat sealing layer in order to improve the bag falling resistance when a laminate containing EVOH in the barrier layer is used. However, according to the study of its inventors, the elastic modulus of the laminate is too high, so that the stand-up pouch disclosed in Patent Literature 2 has low bag falling resistance after the retort treatment, and there is a risk that the contents seep out during actual product display or transportation That is, the stand-up pouch disclosed in Patent Literature 2 has room for improvement in terms of bag falling resistance after the retort treatment.

The present invention has been made in view of the above circumstances, and an object thereof is to provide a laminate from which a stand-up pouch excellent in bag falling resistance after a retort treatment can be obtained.

Solution to Problem

As a result of extensive studies in order to solve the above problems, the present inventors have discovered that when an optional direction orthogonal to a thickness direction of the laminate is used as a reference direction, a product of a tensile elastic modulus A in the reference direction, a tensile elastic modulus B in a direction forming an angle of 45° with respect to the reference direction, and a tensile elastic modulus C in a direction forming an angle of 90° with respect to the reference direction is made to be 0.22 $(GPa)^3$ or less, so that the above problems can be solved. Thus, they have completed the present invention.

That is, the present invention relates to the following <1> to <7>.

<1> A laminate including:
a protection layer;
a barrier layer; and
a heat sealing layer,
wherein the barrier layer has a polyamide-based resin layer and an ethylene-vinyl alcohol-based copolymer layer,
the heat sealing layer contains a polypropylene as a main component, when an optional direction orthogonal to a thickness direction of the laminate is used as a reference direction, a product of a tensile elastic modulus A in the reference direction, a tensile elastic modulus B in a direction forming an angle of 45° with respect to the reference direction, and a tensile elastic modulus C in a direction forming an angle of 90° with respect to the reference direction is 0.22 $(GPa)^3$ or less, and a value of the tensile elastic modulus B to the tensile elastic modulus A, a value of the tensile elastic modulus C to the tensile elastic modulus A, and a value of the tensile elastic modulus C to the tensile elastic modulus B are each 0.1 to 10.

<2> The laminate according to <1>, wherein the heat sealing layer contains a thermoplastic elastomer.

<3> The laminate according to <2>, wherein the thermoplastic elastomer is at least one of an ethylene-α-olefin copolymer and a styrene/ethylene/butylene/styrene block copolymer.

<4> The laminate according to any one of <1> to <3>, wherein the polyamide-based resin layer is adjacent to at least one surface of the ethylene-vinyl alcohol-based copolymer layer.

<5> The laminate according to any one of <1> to <4>, wherein the polyamide-based resin layer contains nylon 6.

<6> The laminate according to any one of <1> to <5>, wherein in the laminate, one surface layer is the protection layer and the other surface layer is the heat sealing layer, and when humidity control is performed for 24 hours, under a condition of 23° C. and 50% RH in the protection layer and a condition of 23° C. and 90% RH in the heat sealing layer, after the laminate is subjected to a hot water treatment at 120° C. for 30 minutes, an oxygen permeability is 1.0 cc/(pkg·day·atm) or less.

<7> A stand-up pouch, including: the laminate according to any one of <1> to <6>.

Advantageous Effects of Invention

According to the present invention, it is possible to provide a laminate from which a stand-up pouch excellent in bag falling resistance after a retort treatment can be obtained. Further, the laminate of the present invention has a low oxygen permeability and an excellent in oxygen barrier property even after the retort treatment.

DESCRIPTION OF EMBODIMENTS

Hereinafter, the present invention will be described in detail, but these show examples of desirable embodiments, and the present invention is not specified in these contents.

In the present invention, a side on which contents of a stand-up pouch is stored, that is, a heat sealing side is referred to as "inner side", and the reverse side is referred to as "outer side".

In the following explanations, terms such as "upper", "lower", "left-hand", and "right-hand" are terms used for convenience in accordance with the directions in a drawing.

In general, the term "film" means a thin flat product which has an extremely small thickness as compared with the length and width thereof and has an optional limited maximum thickness and which is supplied usually in the form of a roll, while the term "sheet" means a flat product generally having a small thickness for the length and width thereof (Japanese Industrial Standards JIS K6900). However, there is no clear boundary between the sheet and the film. In the present invention, since there is no need of distinguishing the two materials by word, any material called a "film" may include the meaning of a "sheet" and any material called a "sheet" may include the meaning of a "film".

[Laminate]

The laminate according to the present invention includes a protection layer, a barrier layer, and a heat sealing layer.

Figure 1:
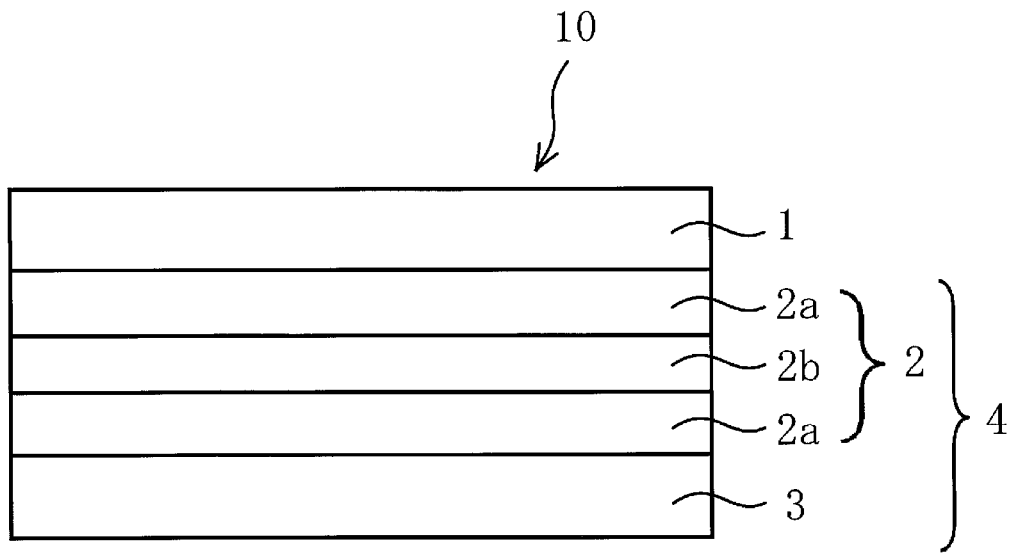
FIG. 1 is a schematic cross-sectional view showing a configuration of a laminate according to an embodiment of the present invention.

More specifically, for example, as shown in FIG. 1, a laminate 10 according to the present invention is formed by laminating a multilayer material 4 with a protection layer 1. Further, the multilayer material 4 has a barrier layer 2 and a heat sealing layer 3, and the barrier layer 2 has a polyamide-based resin layer 2a and an EVOH layer 2b.

Each layer will be explained below.

<Protection Layer>

The protection layer for use in the present invention is a basic material of the laminate according to the present invention. Therefore, as the protection layer for use in the present invention, it is preferred to use a film or sheet of a resin which has excellent strength mechanically, physically, chemically, etc., and which is excellent in terms of piercing resistance, heat resistance, moisture resistance, pinhole resistance, transparency, etc.

Specifically, a film or sheet obtained from polyester-based resins such as polyethylene terephthalate and polyethylene naphthalate, polyamide-based resins such as various nylon resins, polyaramid-based resins, polypropylene-based resins, polyethylene-based resins, polycarbonate-based resins, polyacetal-based resins, fluorine resins, and other tough resins can be used. Among these, a film or sheet obtained from a polyester-based resin is preferred, and a film or sheet obtained from polyethylene terephthalate is more preferred.

As the above film or sheet of a resin, any of a non-stretched film or a stretched film which stretched in uniaxial or biaxial direction, or the like may be used.

The thickness of the protection layer is preferably 5 μm to 100 μm, and more preferably 10 μm to 50 μm. When the thickness of the protection layer is too large, the cost tends to increase, and conversely, when the thickness of the protection layer is too small, the strength, the piercing resistance, and the like tend to decrease.

Further, the protection layer may be suitably provided with a printed layer as needed. Examples of the printed layer include a layer formed from an ink obtained by mixing a solvent, a binder resin such as a urethane-, acrylic-, nitrocellulose-, or rubber-based binder, any of various pigments such as extender pigments, a plasticizer, a drying agent, a stabilizer, etc.

Characters, a design, etc. can be formed on the printed layer. As a printing method, any of known printing methods such as, for example, offset printing, gravure printing, flexographic printing, silk screen printing, and ink jet printing can be used. By subjecting the surface of the protection layer beforehand to a corona treatment or an ozone treatment as a pretreatment, the adhesiveness of the printed layer can be improved. Usually, the printed layer is formed on the inner surface of the protection layer.

<Barrier Layer>

The barrier layer for use in the present invention has a polyamide-based resin layer and an EVOH layer.

(Polyamide-Based Resin Layer)

When the laminate according to the present invention has a polyamide-based resin layer, it is possible to accelerate the recovery of the oxygen barrier property after the retort treatment.

As a polyamide-based resin constituting the polyamide-based resin layer for use in the present invention, a known polyamide-based resin can be used.

Examples of the polyamide-based resin include homopolymers such as polycapramide (nylon 6), poly-ω-aminoheptanoic acid (nylon 7), poly-ω-aminononanoic acid (nylon 9), polyundecaneamide (nylon 11), and polylauryl lactam (nylon 12).

In addition, examples of the polyamide-based resin include copolymerized polyamide resins including: aliphatic copolymerized polyamides such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), a caprolactam/lauryllactam copolymer (nylon 6/12), a caprolactam/ω-aminononanoic acid copolymer (nylon 6/9), a caprolactam/hexamethylenediamine adipate copolymer (nylon 6/66), a lauryllactam/hexamethylenediamine adipate copolymer (nylon 12/66), an ethylenediamine adipamide/hexamethylenediammonium adipate copolymer (nylon 26/66), a caprolactam/hexamethylenediammonium adipate/hexamethylenediammonium sebacate copolymer (nylon 66/610), and an ethyleneammonium adipate/hexamethylenediammonium adipate/hexamethylenediammonium sebacate copolymer (nylon 6/66/610); aromatic copolymerized polyamides such as polyhexamethylene isophthalamide, polyhexamethylene terephthalamide, polymethaxylylene adipamide, a hexamethylene isophthalamide/terephthalamide copolymer, poly-p-phenylene terephthalamide, and poly-p-phenylene 3-4'diphenyl ether terephthalamide; amorphous polyamides; and terminal-modified polyamides in which the above polyamide-based resin is modified with a carboxyl group or an amino group of methylenebenzylamine or metaxylenediamine.

From the viewpoint of bag falling resistance, the polyamide-based resin layer for use in the present invention preferably contains at least one of polycapramide (nylon 6) and a caprolactam/hexamethylenediammonium adipate copolymer (nylon 6/66), and more preferably contains polycapramide (nylon 6).

The thickness (Tp) of the polyamide-based resin layer for use in the present invention is preferably 1 μm to 100 μm, more preferably 1 μm to 80 μm, still more preferably 3 μm to 60 μm, and particularly preferably 5 μm to 40 μm. The polyamide-based resin layer for use in the present invention may be either a single layer or a plurality of layers. In the case of a plurality of layers, the total thickness (Tpt) of the polyamide-based resin layer is preferably 2 μm to 120 μm, more preferably 5 μm to 90 μm, and particularly preferably 10 μm to 80 μm.

When the thickness (Tp) is too small, the impact on the EVOH of the barrier layer cannot be dispersed, the bag falling resistance tends to deteriorate, and the oxygen barrier property tends to deteriorate. Further, the recovery rate of the oxygen barrier property after the retort treatment tends to be low.

When the thickness (Tp) is too large, the thickness of the entire stand-up pouch including the laminate according to the present invention (hereinafter, may be referred to as "stand-up pouch according to the present invention") becomes thick, and the stiffness of the entire stand-up pouch becomes too large, which tends to reduce ease of opening and makes consumers easily cut their hands during use. Further, since a large amount of water is absorbed in the polyamide-based resin layer during the retort treatment, the recovery rate of the oxygen barrier property after the retort treatment tends to be low.

The openability in the present invention refers to a property that when the stand-up pouch is filled with food or the like, the packaging bag mouth easily opens with respect to the blowing of gas such as air and can be used for automatic packaging.

(EVOH Layer)

The EVOH layer may be a layer made of EVOH, or may be a layer made of an EVOH resin composition containing an optional component other than the EVOH.

The EVOH is usually a resin obtained by saponifying a copolymer of ethylene and a vinyl ester-based monomer (ethylene-vinyl ester-based copolymer), and is a water-insoluble thermoplastic resin. The polymerization may be conducted using any known polymerization method such as, for example, solution polymerization, suspension polymerization, or emulsion polymerization. In general, however, use is made of solution polymerization in which a lower alcohol such as methanol is used as the solvent. Saponification of the ethylene-vinyl ester-based copolymer obtained can also be performed by a known method. The EVOH thus produced includes, as main structural units, structural units derived from ethylene and vinyl-alcohol structural units, and includes a slight amount of vinyl-ester structural units remaining unsaponified.

Vinyl acetate is representatively used as the vinyl ester-based monomer from the standpoints of availability on the market and the satisfactory efficiency of treatment for impurity removal during the production. Examples of other vinyl ester-based monomers include aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate and aromatic vinyl esters such as vinyl benzoate. Aliphatic vinyl esters each having usually 3 to 20 carbon atoms, preferably 4 to 10 carbon atoms, and particularly preferably 4 to 7 carbon atoms, can be used. One of these is usually used alone, and two or more thereof may be simultaneously used as needed.

The ethylene content of the EVOH, in terms of the value determined in accordance with ISO 14663, is preferably 20 mol % to 60 mol %, more preferably 25 mol % to 50 mol %, and particularly preferably 25 mol % to 35 mol %. When the content is too low, this EVOH tends to have a reduced oxygen barrier property under high humidity and reduced melt moldability. Conversely, when the content is too high, the oxygen barrier property tends to decease.

The degree of saponification of the vinyl ester component in the EVOH, in ten is of the value determined in accordance with JIS K6726 (the EVOH is examined as an uniform solution in water/methanol solvent), is preferably 90 mol % to 100 mol %, more preferably 95 mol % to 100 mol %, and particularly preferably 99 mol % to 100 mol %. When the degree of saponification is too low, the oxygen barrier property, thermal stability, moisture stability, etc. tend to decrease.

In addition, the melt flow rate (MFR) of the EVOH (210° C., load: 2,160 g) is preferably 0.5 to 100 g/10 min, more preferably 1 to 50 g/10 min, and particularly preferably 3 to 35 g/10 min. When the MFR is too high, this EVOH tends to have a reduced film-forming property. When the MFR is too low, this EVOH tends to have a too high melt viscosity and be difficult to melt-extrude.

The EVOH may further include structural units derived from the comonomer shown below, in addition to the ethylene structural units and the vinyl-alcohol structural units (including unsaponified vinyl-ester structural units). Examples of the comonomer include: α-olefins such as propylene, isobutene, α-octene, α-dodecene, and α-octadecene; hydroxy group-containing α-olefins such as 3-butene-1-ol, 4-pentene-1-ol, and 3-butene-1,2-diol and derivatives of hydroxy-containing α-olefins, such as esterified products and acylated products of those hydroxy-containing α-olefins; unsaturated carboxylic acids or salts, partial alkyl esters, complete alkyl esters, nitriles, amides or anhydrides thereof; unsaturated sulfonic acids or salts thereof; vinylsilane compounds; vinyl chloride; and styrene.

Further, an EVOH which has undergone an "after modification" such as urethane formation, acetalization, cyanoethylation, or oxyalkylene formation can be used.

Preferred of the modifications shown above are EVOHs having primary hydroxy groups which have been incorporated into the side chain by copolymerization, since these EVOHs have satisfactory formability in stretching, vacuum/air-pressure forming, etc. Preferred of these is an EVOH having 1,2-diol structures in side chains.

The EVOH may contain ingredients which are generally mixed into EVOHs, so long as these ingredients do not lessen the effects of the present invention. Examples of such ingredients include a heat stabilizer, an antioxidant, an antistatic agent, a colorant, an ultraviolet absorber, a lubricant, a plasticizer, a light stabilizer, a surfactant, an antibacterial, a drying agent, an antiblocking agent, a flame retardant, a crosslinking agent, a curing agent, a blowing agent, a nucleator, an antifogging agent, an additive for biodegradation, a silane coupling agent, and an oxygen absorber.

Examples of the heat stabilizer include the following substances used for improving various properties including thermal stability during melt molding: organic acids such as acetic acid, propionic acid, butyric acid, lauric acid, stearic acid, oleic acid, and behenic acid or salts thereof such as alkali metal salts (sodium, potassium, etc.), alkaline-earth metal salts (calcium, magnesium, etc.), and zinc salts; or inorganic acids such as sulfuric acid, sulfurous acid, carbonic acid, phosphoric acid, and boric acid or salts thereof such as alkali metal salts (sodium, potassium, etc.), alkaline-earth metal salts (calcium, magnesium, etc.), and zinc salts.

The EVOH may be a mixture thereof with a different EVOH. Examples of the different EVOH include one which differs in ethylene content, one which differs in degree of saponification, one which differs in melt flow rate (MFR) (210° C., load: 2,160 g), one which differs in other comonomer ingredients, and one which differs in modification amount (e.g., one which differs in content of 1,2-diol structural units).

From the viewpoint of retort treatment resistance, the EVOH layer is preferably constituted with an EVOH resin composition containing a polyamide-based resin. The amide bonds in the polyamide-based resin are capable of interacting with the hydroxy groups and/or ester groups of the EVOH to thereby form a network structure. Thus, the EVOH can be prevented from dissolving away during the retort treatment. As the polyamide-based resin, known ones can be used, and for example, the same ones used for the above-mentioned polyamide-based resin layer can be used.

The thickness (Te) of the EVOH layer is preferably 1 μm to 35 μm, more preferably 5 μm to 30 μm, and particularly preferably 8 μm to 25 μm. When the thickness (Te) is too small, the oxygen barrier property tends to decrease, and when the thickness (Te) is too large, the recovery rate of the oxygen barrier property after the retort treatment tends to decrease. When there are a plurality of EVOH layers, the sum of the thicknesses of the plurality of EVOH layers may be within the above range.

<Heat Sealing Layer>

The heat sealing layer for use in the present invention may be any one that can be melted by heat and fused to each other. A resin composition (h) constituting the heat sealing layer for use in the present invention contains a polypropylene as a main component. When the resin composition (h) contains a polypropylene as a main component, a sufficient self-supporting property can be imparted to the stand-up pouch according to the present invention, and the stand-up pouch according to the present invention can be used for retort applications. When a plurality of resin compositions (h) are present, all the resin compositions (h) contain a polypropylene as a main component.

Here, the expression "containing a polypropylene as a main component" means that the content proportion of the polypropylene in the resin composition (h) is more than 50 mass %, and this content proportion is preferably 60 mass % or more, and more preferably 80 mass % or more.

Propylene for use in the polypropylene has various features depending on a homo, random, or block polymerization method.

Among these, a block polypropylene is particularly preferred. The block polypropylene is a thermoplastic polypropylene block copolymer having a form in which a polymer chain derived from propylene (polypropylene polymer chain) is mainly contained and a polymer chain (α-olefin-based polymer chain) derived from an α-olefin other than propylene is bonded to the polypropylene polymer chain by block copolymerization.

As the α-olefin to be copolymerized, an α-olefin other than propylene can be used. Examples thereof include ethylene, 1-butene, 1-pentene, 1-hexene, 4-methyl-1-pentene, 1-heptene, and 1-octene. Preferred are ethylene and 1-butene, and particularly preferred is ethylene. The α-olefin can be used alone or as a combination of two or more kinds thereof.

In addition, the block polypropylene has a structure in which the α-olefin polymer chain is dispersed in the polypropylene polymer chain, and has an ethylene propylene rubber phase (EPR phase) around the α-olefin-based polymer chain, thereby having high impact resistance.

The melt flow rate (MFR; 230° C., load: 2.16 kg) of the block polypropylene is preferably 0.1 to 100 g/10 min, and more preferably 0.2 to 50 g/10 min. The melting point of the block polypropylene is preferably 150° C. to 170° C., and more preferably 160° C. to 165° C.

Further, the resin composition (h) preferably contains a thermoplastic elastomer from the viewpoint of bag falling resistance. Examples of the thermoplastic elastomer include an olefin-based thermoplastic elastomer, a styrene-based thermoplastic elastomer, and a urethane-based thermoplastic elastomer.

Examples of the olefin-based thermoplastic elastomer include an ethylene-α-olefin copolymer, a polypropylene, and a propylene-α-olefin copolymer.

Examples of the styrene-based thermoplastic elastomer include a styrene/isoprene/styrene block copolymer (SIS), a styrene/butadiene/styrene block copolymer (SBS), and a styrene/ethylene/butylene/styrene block copolymer (SEBS).

Examples of the urethane-based thermoplastic elastomer include those having a hard segment composed of diisocyanate and a short chain glycol having a molecular weight of about 50 to 500 (for example, ethylene glycol, propylene glycol, 1,4-butanediol, and bisphenol A), and a soft segment composed of diisocyanate and a long chain polyol. As the long chain polyol, a polyether-based polyol such as a polyalkylene glycol having a molecular weight of 500 to 10,000, or a polyester-based polyol such as polyalkylene adipate, polycaprolactone, or polycarbonate is used.

Among these, from the viewpoint of being excellent in dispersibility, the thermoplastic elastomer is preferably an olefin-based thermoplastic elastomer and a styrene-based thermoplastic elastomer, and more preferably an ethylene-α-olefin copolymer and a styrene/ethylene/butylene/styrene block copolymer.

The content of the thermoplastic elastomer in the resin composition (h) is preferably 0.1 mass % to 60 mass %, more preferably 1 mass % to 50 mass %, and still more preferably 10 mass % to 40 mass %. When the content is too large, in forming a film of a polypropylene-containing thermoplastic elastomer, decomposition products of the thermoplastic elastomer component may be generated in the extruder and adhere to the die lip, which tends to hinder stable film formation. Conversely, when the content is too small, the bag falling resistance tends to be insufficient.

As a resin component other than the thermoplastic elastomer in the resin composition (h), a well-known resin having a heat sealing property (heat sealing resin) can be used. Examples of the heat sealing resin include a resin containing one or more resins of a polyethylene, an ethylene-vinyl acetate copolymer, an ionomer resin, an ethylene-ethyl acrylate copolymer, an ethylene-acrylic acid copolymer, an ethylene-methacrylic acid copolymer, an ethylene-propylene copolymer, a methylpentene polymer, an acid-modified polyolefin-based resin obtained by modifying a polyolefin-based resin such as a polyethylene or a polypropylene with acrylic acid, methacrylic acid, maleic anhydride, fumaric acid, and another unsaturated carboxylic acid.

The content of the resin other than the thermoplastic elastomer in the resin composition (h) is preferably 0 mass % to 30 mass %, more preferably 0.01 mass % to 10 mass %, and still more preferably 0.1 mass % to 5 mass %. When the content is too large, the bag falling resistance tends to be weakened. When the content is too small, there is a high possibility that the thermoplastic elastomer component is eluted toward the content side when the stand-up pouch is subjected to a retort treatment.

The heat sealing layer for use in the present invention can be used as a single layer or a multilayer. The thickness of the heat sealing layer is preferably 30 μm to 300 μm, more preferably 35 μm to 200 μm, and still more preferably 40 μm to 100 μm. When the thickness is too small, the sealing strength of the sealing portion tends to decrease. When the thickness is too large, the stiffness tends to increase, and the openability when filling the stand-up pouch with food or the like tends to decrease.

Examples of a heat sealing film containing a thermoplastic elastomer for use in the heat sealing layer include a heat sealing film obtained by adding an olefin-based thermoplastic elastomer to propylene, a heat sealing film obtained by adding a styrene-based thermoplastic elastomer to propylene, and a heat sealing film obtained by adding a urethane-based thermoplastic elastomer to propylene. Specifically, examples of the heat sealing film obtained by adding a styrene-based thermoplastic elastomer to propylene include "ZK207" and "ZK100" manufactured by TORAY ADVANCED FILM CO., LTD.

<Adhesive Resin Layer>

The laminate according to the present invention may include an adhesive resin layer. The adhesive resin layer is provided to increase the adhesive strength of each layer. When the adhesive resin layers are not properly disposed, each layer tends to peel off with a slight force, making it unbearable for use as a stand-up pouch. The adhesive resin layer is provided at an optional position.

A known adhesive resin can be used as the adhesive resin constituting the adhesive resin layer. Examples of the adhesive resin include a modified polyolefin-based polymer containing a carboxyl group. The modified polyolefin-based polymer is obtained by chemically bonding an unsaturated carboxylic acid or an anhydride thereof to a polyolefin-based resin by an addition reaction, a graft reaction, or the like.

Examples of the modified polyolefin-based polymer include polyethylene modified by grafting with maleic anhydride, polypropylene modified by grafting with maleic anhydride, an ethylene-propylene (block and random) copolymer modified by grafting with maleic anhydride, an ethylene-ethyl acrylate copolymer modified by grafting with maleic anhydride, an ethylene-vinyl acetate copolymer modified by grafting with maleic anhydride, a polycycloolefin-based resin modified with maleic anhydride, and a polyolefin-based resin modified by grafting with maleic anhydride. One polymer selected from among these or a mixture of two or more thereof can be used.

The thickness of the adhesive resin layer is preferably 1 μm to 30 μm, more preferably 2 μm to 20 μm, and particularly preferably 3 μm to 10 μm per layer.

<Adhesive Layer>

The laminate according to the present invention may include an adhesive layer used when laminating two types of layers. A dry lamination adhesive can be used for the adhesive layer. Examples of the dry lamination adhesive include a two-component curable urethane-based adhesive, a polyester urethane-based adhesive, a polyether urethane-based adhesive, an acrylic adhesive, a polyester-based adhesive, a polyamide-based adhesive, and an epoxy-based adhesive. Examples of a method of adhering a protection layer and a barrier layer using these adhesives include a dry laminating method.

Among the above adhesives, it is preferred to use a two-component curable urethane-based adhesive that has excellent adhesive force and whose adhesive force does not easily decrease due to urethane bonding.

The two-component curable urethane adhesive is composed of a main agent and a curing agent, and a two-component curable urethane-based adhesive composed of a polyester polyol and a polyfunctional polyisocyanate is preferred. Examples of the polyfunctional polyisocyanate include diphenylmethane diisocyanate (MDI), hexamethylene diisocyanate (HDI), toluene diisocyanate (TDI), and isophorone diisocyanate (IPDI).

The thickness of the adhesive layer is not particularly limited, and is preferably 0.1 μm or more, more preferably 1 μm or more, and particularly preferably 2 μm or more, in order to maintain sufficient adhesion even after the retort treatment.

<Other Resin Layers>

The laminate according to the present invention may further have other resin layers in addition to the above-mentioned layer, and the position where the other resin layer is laminated is optional.

As the resin constituting the other resin layer, known ones can be used. Examples of such resins include a polyaramid-based resin, a polyethylene-based resin, a polycarbonate-based resin, a polyacetal-based resin, and a fluorine resin.

<Layer Configuration>

In the laminate according to the present invention, it is preferable that the polyamide-based resin layer is adjacent to at least one surface of the EVOH layer, and more preferably the polyamide-based resin layer is adjacent to both surfaces of the EVOH layer. When the EVOH layer and the polyamide-based resin layer are provided to adjacent to each other, the recovery rate of the oxygen barrier property after the retort treatment tends to be faster.

Examples of the layer configuration of the laminate according to the present invention include protection layer/polyamide-based resin layer/EVOH layer/heat sealing layer, protection layer/EVOH layer/polyamide-based resin layer/heat sealing layer, and protection layer/polyamide-based resin layer/EVOH layer/polyamide-based resin layer/heat sealing layer.

In the above layer configuration, the laminate according to the present invention may optionally have an adhesive resin layer and an adhesive layer.

Among these, from the viewpoint of bag falling resistance, protection layer/adhesive layer/polyamide-based resin layer/EVOH layer/polyamide-based resin layer/adhesive resin layer/heat sealing layer, or protection layer/adhesive layer/polyamide-based resin layer/EVOH layer/polyamide-based resin layer/adhesive layer/heat sealing layer is preferred.

When humidity control is performed for 24 hours, under a condition of 23° C. and 50% RH in the protection layer and a condition of 23° C. and 90% RH in the heat healing layer, after the laminate having the above configuration according to the present invention is subjected to a hot water treatment at 120° C. for 30 minutes, the oxygen permeability is preferably 5.0 cc/(pkg·day·atm) or less, more preferably 1.0 cc/(pkg·day·atm) or less, and still more preferably $8 \times 10^{-1}$ cc/(pkg·day·atm) or less, from the viewpoint of the oxygen barrier property to the content.

When humidity control is performed for 72 hours, under a condition of 23° C. and 50% RH in the protection layer and a condition of 23° C. and 90% RH in the heat healing layer, after the laminate having the above configuration according to the present invention is subjected to a hot water treatment at 120° C. for 30 minutes, the oxygen permeability is preferably 1.0 cc/(pkg·day·atm) or less, more preferably $8 \times 10^{-1}$ cc/(pkg·day·atm) or less, and still more preferably $1 \times 10^{-1}$ cc/(pkg·day·atm) or less, from the viewpoint of the oxygen barrier property to the content. The lower limit of the oxygen permeability is 0 cc/(pkg·day·atm).

<Thickness of Layer>

The total thickness of the laminate according to the present invention is preferably 30 μm to 700 μm, more preferably 50 μm to 450 μm, and still more preferably 70 μm to 300 μm. When the total thickness is too large, the stand-up pouch tends not to have the stiffness to maintain the self-supporting property thereof. When the total thickness is too small, the stiffness of the stand-up pouch becomes too high, and the openability when filling the stand-up pouch with food or the like tends to decrease.

The thickness of the multilayer material cannot be unequivocally determined depending on the intended use, packaging form, required physical characteristics, etc., and is preferably 1 μm to 150 μm, more preferably 5 μm to 145 μm, and particularly preferably 10 μm to 140 μm.

The ratio (Te/Tp) of the thickness (Te) of the EVOH layer to the thickness (Tp) of the polyamide-based resin layer is preferably 0.02 to 10, more preferably 0.05 to 5, and particularly preferably 0.1 to 1.0.

When the thickness ratio is too small, the oxygen barrier property tends to decrease, and when the thickness ratio is too large, the recovery of the oxygen barrier property after the retort treatment tends to be delayed.

When each layer is a plurality of layers, the sum of the layer thicknesses may be within the above range.

<Tensile Elastic Modulus>

In the laminate according to the present invention, when an optional direction orthogonal to a thickness direction of the laminate is used as a reference direction, a product (hereinafter, may be referred to as "product EM") of a tensile elastic modulus A in the reference direction, a tensile elastic modulus B in a direction forming an angle of 45° with respect to the reference direction, and a tensile elastic modulus C in a direction forming an angle of 90° with respect to the reference direction is 0.22 $(GPa)^3$ or less.

In the present description, when an optional direction orthogonal to the thickness direction of the laminate is used as a reference direction, the reference direction may be simply referred to as "reference direction". When an optional direction orthogonal to the thickness direction of the laminate is used as the reference direction, the direction forming an angle of 45° with the reference direction may be simply referred to as "45° direction". When an optional direction orthogonal to the thickness direction of the laminate is used as the reference direction, the direction forming an angle of 90° with the reference direction may be simply referred to as "90° direction".

The reference direction is an optional direction as described above, and for example, a flow direction when producing the laminate can be used as the reference direction. Here, the flow direction means a predetermined direction when the protection layer, the barrier layer, and the heat sealing layer are laminated with each other while being sent out in a predetermined direction to continuously produce the laminate.

The tensile elastic modulus, also called Young's modulus, is a constant of proportionality between strain and stress in the coaxial direction of a film for use in a laminate. The present inventors has considered that, regarding the bag falling resistance of the stand-up pouch according to the present invention, it is important to disperse the stress applied at the time of falling in the reference direction, the 45° direction, and the 90° direction from the impact point of the film.

When the product EM is 0.22 $(GPa)^3$ or less, the stress applied at the time of falling can be dispersed in the reference direction, the 45° direction, and the 90° direction from the impact point of the film. Therefore, sufficient bag falling resistance can be maintained even after the retort treatment.

When the product EM is 0.22 $(GPa)^3$ or less, the stiffness of the laminate according to the present invention does not become too high. As a result, even when the stand-up pouch according to the present invention is fallen to have an impact, the stand-up pouch according to the present invention can absorb the impact. Therefore, when the product EM is set to 0.22 $(GPa)^3$ or less, the stand-up pouch according to the present invention can be made excellent in bag falling resistance.

In the conventional stand-up pouch, only the tensile elastic modulus in the reference direction or the 90° direction has been considered. Therefore, the bag falling resistance is not sufficient, and the stand-up pouch is easily broken after the retort treatment.

The product EM is preferably 0.17 $(GPa)^3$ or less, and more preferably 0.15 $(GPa)^3$ or less from the viewpoint of bag falling resistance. When the product EM is too small, the stiffness of the laminate according to the present invention becomes too small, and the stand-up pouch according to the present invention tends to be difficult to stand on its own. Therefore, the product EM is preferably 0.008 $(GPa)^3$ or more, more preferably 0.027 $(GPa)^3$ or more, and still preferably 0.064 $(GPa)^3$ or more.

In addition, in order to obtain certain bag falling resistance even when any part of the stand-up pouch according to the present invention touches the ground when falling, the tensile elastic modulus A, B, C is preferably 0.2 GPa to 1.0 GPa, more preferably 0.3 GPa to 0.8 GPa, and even more preferably 0.4 GPa to 0.6 GPa.

Further, in order to obtain certain bag falling resistance even when any part of the stand-up pouch according to the present invention touches the ground when falling, it is necessary that the value of tensile elastic modulus B to tensile elastic modulus A, the value of tensile elastic modulus C to tensile elastic modulus A, and the value of tensile elastic modulus C to tensile elastic modulus B are each 0.1 to 10. The value is preferably 0.2 to 5.0, and more preferably 0.5 to 2.0, from the viewpoint of bag falling resistance.

The tensile elastic modulus A, B, C can be measured by a tensile test according to K7161-1:2014.

Examples of the method of adjusting the product EM and the tensile elastic modulus A, B, C include (a) a method of adjusting the ratio α of the thickness of a layer having stiffness (heat sealing layer, EVOH layer) to the thickness of the laminate according to the present invention, (b) a method of adjusting the crystallinity β of the laminate according to the present invention, (c) a method for adjusting the flexibility γ of the heat sealing layer in the laminate according to the present invention, and (d) a method of adjusting the flexibility δ of the polymer adjacent to the EVOH layer.

In the method (a), by reducing the ratio α, the tensile elastic modulus A, B, C can be reduced.

In the method (b), by reducing the crystallinity β, the flexibility can be imparted to the laminate according to the present invention, and the tensile elastic modulus A, B, C can be reduced. For example, during the production of the laminate, the crystallinity of the film can be reduced by lengthening the time in which the laminate coming out of the extruder is in contact with the cooling roll and lowering the temperature of the cooling roll.

In the method (c), by softening the heat sealing layer, the tensile elastic modulus A, B, C can be reduced. Examples of the method of softening the heat sealing layer include a method of incorporating a thermoplastic elastomer to the heat-sealing layer.

In the method (d), by increasing the flexibility δ, the tensile elastic modulus A, B, C can be reduced. Examples of the method of increasing the flexibility δ include a method using a polyamide resin having a short monomer molecular chain of polyamide. This is because when the polyamide resin layer is adjacent to the EVOH layer, the crystallinity increases and becomes harder as the monomer molecular chain of the polyamide becomes longer.

The method of adjusting the product EM and the tensile elastic modulus A, B, C is not particularly limited, and can be achieved by appropriately combining the above methods and the like.

<Method for Producing Laminate>

The laminate according to the present invention can be obtained by (1) a method of laminating a multilayer material including a barrier layer (polyamide-based resin layer, EVOH layer) and a heat sealing layer on a protection layer, (2) a method of sequentially laminating a barrier layer (polyamide-based resin layer, EVOH layer) and a heat sealing layer on a protection layer, and (3) a method of laminating any layer of a protection layer, a barrier layer (polyamide-based resin layer, EVOH layer) and a heat sealing layer, and then laminating the remaining layers.

First, a method for producing a multilayer material including a barrier layer (polyamide-based resin layer, EVOH layer) and a heat sealing layer, particularly a multi-layer material (polyamide-based resin layer/EVOH layer/heat sealing layer) in which a polyamide-based resin layer, an EVOH layer, and a heat sealing layer are laminated in this order will be described.

Lamination of the multilayer material can be performed by a melt molding method, a wet lamination method, a dry lamination method, a solvent-free lamination method, an extrusion lamination method, a coextrusion lamination method, an inflation method or the like. Among these, preferred is a melt molding method, from the environmental standpoint that no solvent is used and from the cost standpoint that there is no need of performing lamination in a separate step.

As a method for the melt molding method, a known technique can be employed. Examples thereof include an extrusion molding method (T-die extrusion, tubular-film extrusion, blow molding, melt spinning, profile extrusion, etc.) and an injection molding method. The melt molding temperature is suitably selected usually from the range of 150° C. to 300° C.

The multilayer material can optionally include an adhesive resin layer and an adhesive layer as described in the above <Layer Configuration>, and even when these layers are provided, the multilayer material can be produced by the same method as described above.

Subsequently, a method for laminating the protection layer and the multilayer material will be described.

As the method for laminating the protection layer and the multilayer material, lamination method used in the production of ordinary packaging materials can be used, for example, a wet lamination method, a dry lamination method, a solvent-free lamination method, an extrusion lamination method, a coextrusion lamination method, an inflation method or the like.

When performing the above lamination, if necessary, for example, the surface of the substrate to be laminated can be optionally subjected to a pretreatment such as a corona treatment, an ozone treatment, and a frame treatment.

In addition, in the case of dry lamination, for example, a solvent type, water-based type, or emulsion type lamination adhesive containing a vinyl, acrylic, polyurethane, polyamide, polyester, or epoxy as the main component of the vehicle is used.

At this time, for example, an isocyanate-based adhesive aid, a polyethyleneimine-based adhesive aid, another anchor coating agent, or the like can be optionally used as the adhesive aid.

In the case of extrusion lamination in the above, for example, a polyethylene, a polypropylene, an ethylene-vinyl acetate copolymer, an ionomer resin, an ethylene-ethyl acrylate copolymer, an ethylene-acrylic acid copolymer, an ethylene-methacrylic acid copolymer, an ethylene-propylene copolymer, a methylpentene polymer, an acid-modified polyolefin-based resin obtained by modifying a polyolefin-based resin such as a polyethylene or a polypropylene with acrylic acid, methacrylic acid, maleic anhydride, fumaric acid, and another unsaturated carboxylic acid can be used as the resin for melt extrusion lamination.

It is also possible to form a plurality of types of protection layers and a multilayer material (for example, protection layer/protection layer/multilayer material). It is also possible to form protection layer/multilayer material/protection layer. The protection layers can be laminated in the same manner as described above.

[Stand-Up Pouch]

The stand-up pouch according to the present invention includes the laminate according to the present invention. The stand-up pouch according to the present invention includes a body portion and a bottom portion provided perpendicular to the body portion, and has stiffness that allows it to stand on its own when filled with contents.

<Configuration of Stand-Up Pouch>

Figure 2:
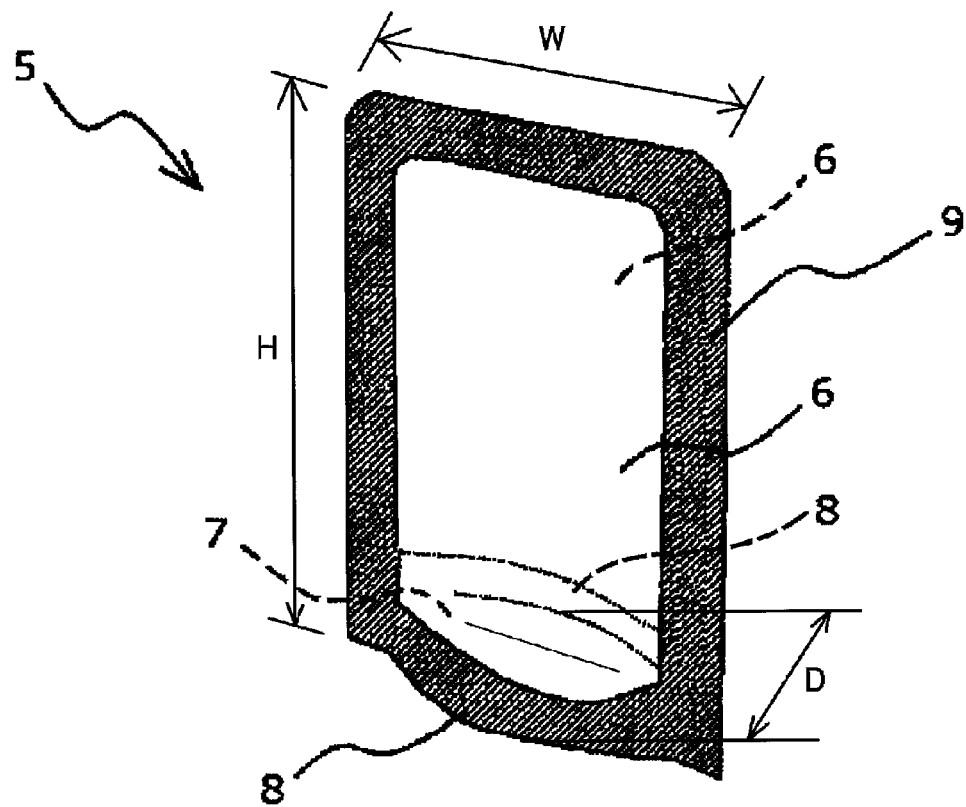
FIG. 2 is an overall perspective view showing an example of a stand-up pouch according to the present invention.

FIG. 2 is an overall perspective view showing an example of the stand-up pouch according to the present invention. A stand-up pouch 5 according to the present invention includes two front and back body films 6, 6 and a bottom film 7. The body film 6 and the bottom film 7 are flexible films, and are obtained by cutting the laminate according to the present invention into a desired size. The laminate according to the present invention is disposed such that the multilayer material side is located inside, that is, the protection layer side is located outside.

The bottom film 7 is inserted between lower portions of the two body films 6, 6 in a folded state. A bottom seal portion 8 is formed by sealing lower edge portions of the body films 6, 6 and a peripheral edge of the bottom film 7. A side seal portion 9 is formed by sealing left and right edges of the body film 6, 6 in an overlapped state. Accordingly, the bottom film 7 expands to form the stand-up pouch 5 in a state of being filled with contents.

In the present invention, with the upper portion of the stand-up pouch 5 open, the contents such as desired food and drink are filled through the opening. Then, the upper opening is heat-sealed to form a top-sealed portion or the like to produce a semi-finished package. Thereafter, the semi-finished package can be subjected to a retort treatment such as a pressure heat sterilization treatment to produce retort-packed foods having various forms.

The stand-up pouch according to the present invention can be provided with a joint or can be provided with a design at an optional position.

The dimension of the stand-up pouch 5 is the dimension of the laminate portion not including the joint or the like. For example, the width W is 50 mm to 1000 mm, preferably 100 mm to 500 mm, and particularly preferably 100 mm to 200 mm. The height H is 50 mm to 1000 mm, preferably 100 mm to 500 mm, and particularly preferably 150 mm to 300 mm. The depth D of the bottom portion is 10 mm to 500 mm, preferably 20 mm to 300 mm, and particularly preferably 30 mm to 100 mm.

The ratio (H/W) of the height H to the width W is, for example, 0.2 to 10, preferably 1 to 5, and particularly preferably greater than 1 and 2 or less. When the ratio (H/W) is within such a range, the visibility and display efficiency of the stand-up pouch 5 tend to be improved. The dimension can be made into desired dimensions by adjusting the sizes of the body film 6 and the bottom film 7 constituting the stand-up pouch 5. In order to make the stand-up pouch self-supporting, the bottom film is inserted in a folded state, and in the self-supporting state of the stand-up pouch, the bottom film is opened from the folded state.

Although the bottom film 7 is rectangular, the bottom film 7 is formed into a substantially elliptical shape by adjusting the bottom portion in order to keep the depth D of the bottom portion of the stand-up pouch 5 within the above range. The size of the substantially elliptical shape formed by the bottom film 7 is such that the major axis is a size same as the width of the body film 6, and the minor axis is 10 mm to 500 mm, preferably 20 mm to 300 mm, and particularly preferably 30 mm to 100 mm Such a minor axis is usually 1 to 1.5 times the depth D of the bottom portion.

Next, a specific method for producing the stand-up pouch according to the present invention will be described.

<Method for Producing Stand-Up Pouch>

In order to form a stand-up pouch, the laminate according to the present invention is slit to a predetermined width to form a body film and a bottom film. As shown in FIG. 2, two body films 6, 6 are overlapped such that the multilayer material sides face each other, and the bottom film 7 is sandwiched between the lower portions of the two body films 6, 6 to seal the bottom portion and the left and right sides to form the bottom seal portion 8 and the left and right side seal portions 9, thereby forming the stand-up pouch 5 having an open top portion, that is, upper portion.

The stand-up pouch thus formed has an improved self-supporting property, and has no breakage of the side seal or deformation of the packaging bag due to crushing even when the contents are used and the amount thereof is reduced, and can be bent between air-filled portions, so that the volume of the packaging bag can be reduced for storage. In addition, even when the packaging bag is discarded after use, the volume of the packaging bag can be reduced by bending and folding between the air-filled portions.

The stand-up pouch according to the present invention can be obtained by using the laminate according to the present invention in at least one part of the body film and the bottom film. A stand-up pouch made of the laminate according to the present invention, which uses the laminate according to the present invention for all of the body film and the bottom film, is most preferred in that the effect of the present invention can be obtained more effectively.

<Contents of Stand-Up Pouch>

Examples of the content to be packaged and filled into the stand-up pouch according to the present invention include various foods and drinks such as cooked foods, fish paste products, frozen foods, simmered dishes, rice cakes, liquid soups, seasonings, and drinking water. Specific examples thereof include liquid foods such as curry, stew, soup, meat sauce, hamburger steak, meatballs, sushi, oden, and porridge, jelly-like foods, seasonings, water, and various other foods and drinks. Particularly in the present invention, when the content contains a liquid, the effect of the present invention tends to be obtained more effectively.

EXAMPLES

The present invention will be specifically described by way of the following examples, but the present invention is not limited thereto.

[Material for Use]

The following materials were used as the material of the laminate. "PET" means polyethylene terephthalate, "Ny" means nylon, "EVOH" means an ethylene-vinyl alcohol-based copolymer, "PE" means polyethylene, and "PP" means polypropylene.

(Protection Layer)

PET1: "Ester film E5102" manufactured by Toyobo Co., Ltd.

PET2: "FE2001A" manufactured by Futamura Chemical Co., Ltd.

(Barrier Layer)

Ny1: "1020B" (nylon 6) manufactured by Ube Industries, Ltd.

Ny2: "Novamid 2430J" (nylon 6/66) manufactured by DSM

EVOH: an EVOH having an ethylene content of 29 mol %, a degree of saponification of 99.8 mol %, and an MFR of 6.5 g/10 min (230° C., load: 2,160 g)

(Heat Sealing Layer)

PE1: linear low density polyethylene ("Kernel KF370" manufactured by Japan Polyethylene Corporation), 100 mass %

PP1: block polypropylene ("Novatec PP BC6DRF" manufactured by Japan Polypropylene Corporation), 100 mass %

PP2: random polypropylene ("Wintec WFW5T" manufactured by Japan Polypropylene Corporation), 100 mass %

PP3: a mixture of 90 mass % of block polypropylene ("Novatec PP BC6DRF" manufactured by Japan Polypropylene Corporation) and 10 mass % of thermoplastic elastomer ("TAFMER A1085" (ethylene-1 butene copolymer) manufactured by Mitsui Chemicals Inc.)

PP4: a mixture of 80 mass % of block polypropylene ("Novatec PP BC6DRF" manufactured by Japan Polypropylene Corporation) and 20 mass % of thermoplastic elastomer ("TAFMER A1085" (ethylene-1 butene copolymer) manufactured by Mitsui Chemicals Inc.)

PP5: a mixture of 60 mass % of block polypropylene ("Novatec PP BC6DRF" manufactured by Japan Polypropylene Corporation) and 40 mass % of thermoplastic elastomer ("TAFMER A1085" (ethylene-1 butene copolymer) manufactured by Mitsui Chemicals Inc.)

PP6: "TORAYFAN ZK207" manufactured by Toray Film Processing Co., Ltd., 100 mass %

(Adhesive Resin Layer)

Tie: "Plexar PX6002" manufactured by Lyondell Basell Industries (Adhesive Layer)

Adh: dry lamination adhesive (main agent: "TM-242A" manufactured by Toyo-Morton, Ltd., curing agent: "CAT-RT37L" manufactured by Toyo-Morton, Ltd., main agent: curing agent:ethyl acetate=17:1.5:19.2)

Example 1

A multilayer material of Ny1 (10 μm)/EVOH (20 μm)/Ny1 (10 μm)/Tie (5 μm)/PP4 (55 μm) was prepared using a 9-kind 9-layer inflation molding machine (manufactured by Sumitomo Heavy Industries Modern, Ltd.). The thickness of the obtained multilayer material was 100 μm.

The multilayer material obtained above was coated onto PET1 (12 μm) by dry lamination at 3 g/m² using Adh as a solid content, to prepare a laminate. The laminate was aged at 40° C. for 48 hours.

The structure of the obtained laminate was PET1 (12 μm)/Adh (3 μm)/Ny1 (10 μm)/EVOH (20 μm)/Ny1 (10 μm)/Tie (5 μm)/PP4 (55 μm). The total thickness of the obtained laminate was 115 μm.

Example 2

In the same manner as in Example 1, a multilayer material of Ny1 (10 μm)/EVOH (20 μm)/Ny1 (10 μm)/Tie (5 μm)/PP5 (55 μm) was prepared. The thickness of the obtained multilayer material was 100 μm.

In the same manner as in Example 1, Adh was coated onto PET1 (12 μm) at 3 g/m², and the multilayer material obtained above was laminated thereon to obtain a laminate.

The structure of the obtained laminate was PET1 (12 μm)/Adh (3 μm)/Ny1 (10 μm)/EVOH (20 μm)/Ny1 (10 μm)/Tie (5 μm)/PP5 (55 μm). The total thickness of the obtained laminate was 115 μm.

Example 3

A multilayer structure (thickness: 40 μm) of Ny1 (10 μm)/EVOH (20 μm)/Ny1 (10 μm) was prepared using a 9-kind 9-layer inflation molding machine (manufactured by Sumitomo Heavy Industries Modern, Ltd.).

Adh was coated as a solid content onto PET1 (12 μm) at 3 g/m², and the multilayer structure of Ny1 (10 μm)/EVOH (20 μm)/Ny1 (10 μm) obtained above was laminated on the PET1. Thereafter, Adh was coated as a solid content at 3 g/m² onto the Ny1 surface opposite to the surface on which the PET1 was laminated, a PP6 film (60 μm) was laminated on the surface, and aging was performed at room temperature for 24 hours to obtain a laminate.

The structure of the obtained laminate was PET1 (12 μm)/Adh (3 μm)/Ny1 (10 μm)/EVOH (20 μm)/Ny1 (10 μm)/Adh (3 μm)/PP6 (60 μm). The total thickness of the obtained laminate was 118 μm.

Comparative Example 1

In the same manner as in Example 1, a multilayer material of Ny1 (10 μm)/EVOH (20 μm)/Ny1 (10 μm)/Tie (5 μm)/PP1 (55 μm) was prepared. The thickness of the obtained multilayer material was 100 μm.

In the same manner as in Example 1, Adh was coated onto PET1 (12 μm) at 3 g/m², and the multilayer material obtained above was laminated thereon to obtain a laminate.

The structure of the obtained laminate was PET1 (12 μm)/Adh (3 μm)/Ny1 (10 μm)/EVOH (20 μm)/Ny1 (10 μm)/Tie (5 μm)/PP1 (55 μm). The total thickness of the obtained laminate was 115 μm.

Comparative Example 2

In the same manner as in Example 1, a multilayer material of Ny1 (10 μm)/EVOH (20 μm)/Ny1 (10 μm)/Tie (5 μm)/PP2 (55 μm) was prepared. The thickness of the obtained multilayer material was 100 μm.

In the same manner as in Example 1, Adh was coated onto PET1 (12 μm) at 3 g/m², and the multilayer material obtained above was laminated thereon to obtain a laminate.

The structure of the obtained laminate was PET1 (12 μm)/Adh (3 μm)/Ny1 (10 μm)/EVOH (20 μm)/Ny1 (10 μm)/Tie (5 μm)/PP2 (55 μm). The total thickness of the obtained laminate was 115 μm.

Comparative Example 3

In the same manner as in Example 1, a multilayer material of Ny1 (10 μm)/EVOH (20 μm)/Ny1 (10 μm)/Tie (5 μm)/PE1 (55 μm) was prepared. The thickness of the obtained multilayer material was 100 μm.

In the same manner as in Example 1, Adh was coated onto PET1 (12 μm) at 3 g/m², and the multilayer material obtained above was laminated thereon to obtain a laminate.

The structure of the obtained laminate was PET1 (12 μm)/Adh (3 μm)/Ny1 (10 μm)/EVOH (20 μm)/Ny1 (10 μm)/Tie (5 μm)/PE1 (55 μm). The total thickness of the obtained laminate was 115 μm.

Comparative Example 4

In the same manner as in Example 1, a multilayer material of Ny1 (10 μm)/EVOH (20 μm)/Ny1 (10 μm)/Tie (5 μm)/PP1 (65 μm) was prepared. The thickness of the obtained multilayer material was 110 μm.

In the same manner as in Example 1, Adh was coated onto PET1 (12 μm) at 3 g/m², and the multilayer material obtained above was laminated thereon to obtain a laminate.

The structure of the obtained laminate was PET1 (12 μm)/Adh (3 μm)/Ny1 (10 μm)/EVOH (20 μm)/Ny1 (10 μm)/Tie (5 μm)/PP1 (65 μm). The total thickness of the obtained laminate was 125 μm.

Comparative Example 5

In the same manner as in Example 1, a multilayer material of Ny1 (10 μm)/EVOH (20 μm)/Ny1 (10 μm)/Tie (5 μm)/PE1 (20 μm)/PP1 (35 μm) was prepared. The thickness of the obtained multilayer material was 100 μm.

In the same manner as in Example 1, Adh was coated onto PET1 (12 μm) at 3 g/m², and the multilayer material obtained above was laminated thereon to obtain a laminate.

The structure of the obtained laminate was PET1 (12 μm)/Adh (3 μm)/Ny1 (10 μm)/EVOH (20 μm)/Ny1 (10 μm)/Tie (5 μm)/PE1 (20 μm)/PP1 (35 μm). The total thickness of the obtained laminate was 115 μm.

Comparative Example 6

In the same manner as in Example 1, a multilayer material of Ny1 (10 μm)/EVOH (20 μm)/Ny1 (10 μm)/Tie (5 μm)/PP3 (55 μm) was prepared. The thickness of the obtained multilayer material was 100 μm.

In the same manner as in Example 1, Adh was coated onto PET1 (12 μm) at 3 g/m², and the multilayer material obtained above was laminated thereon to obtain a laminate.

The structure of the obtained laminate was PET1 (12 μm)/Adh (3 μm)/Ny1 (10 μm)/EVOH (20 μm)/Ny1 (10 μm)/Tie (5 μm)/PP3 (55 μm). The total thickness of the obtained laminate was 115 μm.

Comparative Example 7

In the same manner as in Example 1, a multilayer material of Ny2 (10 μm)/EVOH (20 μm)/Ny2 (10 μm)/Tie (5 μm)/PP4 (45 μm)/PP3 (10 μm) was prepared. The thickness of the obtained multilayer material was 100 μm.

Adh was coated as a solid content onto PET2 (12 μm) at 3 g/m², the multilayer material obtained above was laminated thereon, and aging was performed at room temperature for 24 hours to obtain a laminate.

The structure of the obtained laminate was PET2 (12 μm)/Adh (3 μm)/Ny2 (10 μm)/EVOH (20 μm)/Ny2 (10 μm)/Tie (5 μm)/PP4 (45 μm)/PP3 (10 μm). The total thickness of the obtained laminate was 115 μm.

Comparative Example 8

In the same manner as in Example 1, a multilayer material of Ny2 (10 μm)/EVOH (20 μm)/Ny2 (10 μm)/Tie (5 μm)/PP5 (45 μm)/PP3 (10 μm) was prepared. The thickness of the obtained multilayer material was 100 μm.

In the same manner as in Comparative Example 7, Adh was coated onto PET2 (12 μm) at 3 g/m², and the multilayer material obtained above was laminated thereon to obtain a laminate.

The structure of the obtained laminate was PET2 (12 μm)/Adh (3 μm)/Ny2 (10 μm)/EVOH (20 μm)/Ny2 (10 μm)/Tie (5 μm)/PP5 (45 μm)/PP3 (10 μm). The total thickness of the obtained laminate was 115 μm.

[Tensile Elastic Modulus]

Each laminate obtained in the above Examples and Comparative Examples was cut into a width of 15 mm and a length of 200 mm to obtain each sample laminate.

When the flow direction (MD) in producing each sample laminate was used as a reference direction, a tensile elastic modulus A (GPa) in the reference direction, a tensile elastic modulus B (GPa) in a direction forming an angle of 45° with respect to the reference direction, and a tensile elastic modulus C (GPa) in a direction forming an angle of 90° with respect to the reference direction were obtained. In accordance with K7161-1: 2014, the measurement of each tensile elastic modulus was performed 5 times using a measurement instrument: Autograph AGS-H (manufactured by Shimadzu Corporation) at a tensile test speed of 100 mm/min and a distance between chucks of 50 mm, and each tensile elastic modulus was calculated from the average. Further, the product of the obtained tensile elastic modulus A, tensile elastic modulus B and tensile elastic modulus C was defined as a product EM $(GPa)^3$. The results are shown in Table 1.

[Laminate Evaluation]

(Retort Treatment Resistance)

A stand-up pouch (width: 140 mm×height: 180 mm×bottom minor axis: 60 mm, bottom depth: 58 mm) was prepared using each laminate obtained in the above Examples and Comparative Examples. The bag making machine used for producing the stand-up pouch was "BH-60D" manufactured by TOTANI CORPORATION, and the side seal, the bottom seal, and the point seal portion at the intersection of the side and the bottom were set to 200° C.

Each of the obtained stand-up pouches was filled with 300 ml of water, and the upper side was heat-sealed while not allowing air to enter each stand-up pouch as much as possible Next, each stand-up pouch filled with water was subjected to a hot water treatment at 120° C. for 30 minutes using an immersion hot water treatment device (manufactured by HISAKA WORKS, LTD.), and then taken out from the hot water treatment device. The appearance was confirmed, and was evaluated according to the following criteria. The results are shown in Table 1.

A: there was no change in the appearance of the stand-up pouch after the hot water treatment.

C: after the hot water treatment, the end portion of the stand-up pouch was eluted, causing delamination.

(Bag Falling Resistance Before Retort Treatment)

Each stand-up pouch filled with 300 ml of water was prepared under the same conditions as the above (Retort Treatment Resistance). Ten stand-up pouches were prepared for each Example and Comparative Example.

Next, each stand-up pouch filled with water was freely dropped from a height of 1 m with the bottom portion of the stand-up pouch parallel to a concrete floor (floor made of vinyl material with a thickness of 2.0 mm on concrete via an adhesive). The number of times each stand-up pouch broke was counted and evaluation was performed according to the following criteria. The average value of the then stand-up pouches was used as the number of times until the bag was broken in each Example and Comparative Example. The results are shown in Table 1.

A: the number of times until the stand-up pouch broke was 21 or more.

B: the number of times until the stand-up pouch broke was 11 to 20.

C: the number of times until the stand-up pouch broke was 1 to 10.

(Bag Falling Resistance after Retort Treatment)

Each stand-up pouch filled with 300 ml of water was prepared under the same conditions as the above (Retort Treatment Resistance). Ten stand-up pouches were prepared for each Example and Comparative Example.

Next, each stand-up pouch filled with water was subjected to a hot water treatment at 120° C. for 30 minutes using an immersion hot water treatment device (manufactured by HISAKA WORKS, LTD.), then taken out from the hot water treatment device, and allowed to stand at an environment of 23° C. and 50% RH for 7 days.

In Comparative Examples 3 and 5 in which the evaluation in the above (Retort Treatment Resistance) was "C", the hot water treatment was not carried out.

Thereafter, each stand-up pouch other than Comparative Examples 3 and 5 was freely dropped and evaluated by the method described in the above (Bag Falling Resistance before Retort Treatment). The results are shown in Table 1.

(Oxygen Barrier Property)

Each stand-up pouch filled with 300 ml of water was prepared under the same conditions as the above (Retort Treatment Resistance).

Next, each stand-up pouch filled with water was subjected to a hot water treatment at 120° C. for 30 minutes using an immersion hot water treatment device (manufactured by HISAKA WORKS, LTD.), and then taken out from the hot water treatment device.

In Comparative Examples 3 and 5 in which the evaluation in the above (Retort Treatment Resistance) was "C", the hot water treatment was not carried out.

Thereafter, water was drained from each stand-up pouch other than Comparative Examples 3 and 5, and the oxygen barrier property was measured.

The measurement instrument and measurement conditions for the oxygen barrier property were as follows.

Measurement instrument: Ox-tran2/21 (manufactured by Mocon Inc.)

Measurement conditions for protection layer surface: 23° C. and 50% RH Measurement conditions for heat sealing layer surface: 23° C. and 90% RH Table 1 shows the oxygen permeability (cc/(pkg·day·atm)) of each laminate 24 hours and 72 hours after the start of the oxygen permeability measurement.

TABLE 1

| | | Example 1 | Example 2 | Example 3 | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|---|
| Heat sealing layer | | PP4 (55 μm) | PP5 (55 μm) | PP6 (60 μm) | PP1 (55 μm) | PP2 (55 μm) | PE1 (55 μm) | PP1 (65 μm) | PE1 (20 μm)/ PP1 (35 μm) | PP3 (55 μm) | PP4 (45 μm)/ PP3 (10 μm) | PP5 (45 μm)/ PP3 (10 μm) |
| Tensile elastic modulus | A: reference direction (GPa) | 0.62 | 0.55 | 0.60 | 0.71 | 0.91 | 0.50 | 0.81 | 0.72 | 0.62 | 0.64 | 0.62 |
| | B: 45° (GPa) | 0.59 | 0.57 | 0.52 | 0.67 | 0.55 | 0.39 | 0.71 | 0.39 | 0.66 | 0.68 | 0.62 |
| | C: 90° (GPa) | 0.57 | 0.46 | 0.47 | 0.49 | 0.78 | 0.41 | 0.46 | 0.46 | 0.65 | 0.60 | 0.61 |
| | Product EM (GPa)$^3$ of A, B, C | 0.21 | 0.14 | 0.14 | 0.23 | 0.39 | 0.08 | 0.26 | 0.13 | 0.26 | 0.26 | 0.23 |
| Retort treatment resistance | | A | A | A | A | A | C | A | C | A | A | A |
| Bag falling resistance | Before retort treatment | B | A | A | C | C | A | C | A | C | B | A |
| | After retort treatment | B | B | A | C | C | — | C | — | B | C | C |
| Oxygen permeability [cc/(pkg · day · atm)] | After 24 hours | 0.623 | 0.66 | 0.539 | 0.601 | 0.553 | — | 0.712 | — | 0.662 | 0.614 | 0.918 |
| | After 72 hours | 0.005 | 0.005 | 0.005 | 0.005 | 0.005 | — | 0.005 | — | 0.006 | 0.005 | 0.007 |

As seen from the results in Table 1, the stand-up pouches prepared by using the laminates of Examples 1 to 3 are excellent in bag falling resistance before and after the retort treatment and in retort treatment resistance.

Also as seen from the results in Table 1, the laminates of Examples 1 to 3 have low oxygen permeability even 24 hours or 72 hours after the completion of the hot water treatment, and are excellent in oxygen barrier property.

Although the present invention has been described in detail with reference to a specific embodiment, it will be apparent to those skilled in the art that various changes and modifications can be made without departing from the spirit and the scope of the present invention. The present application is based on a Japanese Patent Application (Japanese Patent Application No. 2018-214871) filed on Nov. 15, 2018, contents of which are incorporated herein by reference.

REFERENCE SIGNS LIST 1 protection layer
2 barrier layer
2a polyamide-based resin layer
2b EVOH layer 3 heat sealing layer
4 multilayer material
5 stand-up pouch
6 body film
7 bottom film
8 bottom seal portion
9 side seal portion
10 laminate

The invention claimed is:

1. A laminate comprising:
a protection layer;
a barrier layer; and
a heat sealing layer,
wherein the barrier layer has a polyamide-based resin layer and an ethylene-vinyl alcohol-based copolymer layer,
the heat sealing layer contains a polypropylene as a main component,
when an orthogonal direction to a thickness direction of the laminate is used as a reference direction, a product of a tensile elastic modulus A in the reference direction, a tensile elastic modulus B in a direction forming an angle of 45° with respect to the reference direction, and a tensile elastic modulus C in a direction forming an angle of 90° with respect to the reference direction is 0.22 (GPa)$^3$ or less, and
a value of the ratio of the tensile elastic modulus B to the tensile elastic modulus A, a value of the ratio of the tensile elastic modulus C to the tensile elastic modulus A, and a value of the ratio of the tensile elastic modulus C to the tensile elastic modulus B are each 0.1 to 10,
wherein the polyamide-based resin layer contains nylon 6.

2. The laminate according to claim 1, wherein the polyamide-based resin layer is adjacent to at least one surface of the ethylene-vinyl alcohol-based copolymer layer.

3. The laminate according to claim 1,
wherein in the laminate, one surface layer is the protection layer and the other surface layer is the heat sealing layer, and
when humidity control is performed for 24 hours, under a condition of 23° C. and 50% RH in the protection layer and a condition of 23° C. and 90% RH in the heat sealing layer, after the laminate is subjected to a hot water treatment at 120° C. for 30 minutes, an oxygen permeability is 1.0 cc/(pkg·day·atm) or less.

4. A stand-up pouch, comprising: the laminate according to claim 1.

5. The laminate of claim 1, wherein the heat sealing layer has a thickness of 30 μm to 300 μm.

6. The laminate of claim 1, wherein the ethylene-vinyl alcohol-based copolymer layer has a thickness of 1 μm to 35 μm.

7. The laminate of claim 1, wherein the heat sealing layer has a thickness of 30 μm to 300 μm, and the ethylene-vinyl alcohol-based copolymer layer has a thickness of 1 μm to 35 μm.

8. The laminate of claim 1, wherein the polyamide-based resin layer has a thickness of 1 μm to 100 μm.

9. The laminate of claim 1, wherein a ratio Te/Tp, of thickness Te of the ethylene-vinyl alcohol-based copolymer layer, to thickness Tp of the polyamide-based resin layer, is 0.02 to 10.

10. The laminate according to claim 1, wherein the heat sealing layer contains a thermoplastic elastomer.

11. The laminate according to claim 10, wherein the thermoplastic elastomer is at least one of an ethylene-α-olefin copolymer and a styrene/ethylene/butylene/styrene block copolymer.

* * * * *